United States Patent [19]
Lu et al.

[11] Patent Number: 6,128,357
[45] Date of Patent: Oct. 3, 2000

[54] DATA RECEIVER HAVING VARIABLE RATE SYMBOL TIMING RECOVERY WITH NON-SYNCHRONIZED SAMPLING

[75] Inventors: Cheng-Youn Lu, Cresskill; Jay Bao, Bridgewater; Tommy C. Poon, Murray Hill, all of N.J.

[73] Assignee: Mitsubishi Electric Information Technology Center America, Inc (ITA), Cambridge, Mass.

[21] Appl. No.: 08/997,772

[22] Filed: Dec. 24, 1997

[51] Int. Cl.[7] .............................. H04L 7/00; H04L 25/36; H04L 25/40; H03D 3/24
[52] U.S. Cl. ...................... 375/355; 375/327; 375/354; 375/371; 375/373; 375/376; 329/325; 329/360; 329/361; 348/538
[58] Field of Search ........................ 375/371, 354, 375/215, 294, 327, 355, 373, 376, 362; 364/724.1; 329/325, 360, 361; 348/538

[56] References Cited

U.S. PATENT DOCUMENTS

| | | | |
|---|---|---|---|
| 4,453,259 | 6/1984 | Miller | 375/355 |
| 4,794,341 | 12/1988 | Barton et al. | 329/304 |
| 5,235,622 | 8/1993 | Yoshida | 375/355 |
| 5,724,396 | 3/1998 | Claydon et al. | 375/355 |
| 5,764,113 | 6/1998 | Snell | 332/103 |
| 5,805,619 | 9/1998 | Gardner et al. | 371/61 |
| 5,872,818 | 2/1999 | Choi | 375/355 |
| 5,943,369 | 8/1999 | Knutson et al. | 375/326 |

FOREIGN PATENT DOCUMENTS

0926857  6/1999  European Pat. Off. .......... H04L 7/02

*Primary Examiner*—Stephen Chin
*Assistant Examiner*—Michael W. Maddox
*Attorney, Agent, or Firm*—Dirk Brinkman

[57] ABSTRACT

An adaptable, variable rate symbol timing recovery system for a digital signal receiver comprises an analog to digital (A-D) signal converter having analog signal input and digital data signal output terminals. A source of selectable, substantially fixed rate, data sampling clock signals is coupled to the A-D signal converter for sampling a signal received at the input at a predetermined, substantially fixed clock rate, depending on data rate and modulation of the received signal. A digital signal processing loop is coupled to the digital data signal output terminal for adjustably producing interdependent signals in synchronism with the data signals at the output terminal which are asynchronous with respect to the fixed rate clock signals. A Controller is provided for selectively configuring the data sampling clock signal source and the digital signal processing loop according to the data rate and modulation characteristics of the received signal.

15 Claims, 1 Drawing Sheet

DATA RECEIVER HAVING VARIABLE RATE SYMBOL TIMING RECOVERY WITH NON-SYNCHRONIZED SAMPLING

FIELD OF THE INVENTION

This invention relates to a high speed digital receiver, such as a digital television signal receiver, having an adaptable or reconfigurable symbol timing recovery system with non-synchronized sampling. The system can be used for processing signals having different data rates and different modulation schemes.

BACKGROUND OF THE INVENTION

There are certain types of transmitted digital data signals which do not readily lend themselves to conventional phase-locked loop detection techniques. In the customary phase-locked loop detector, timing of the sampling clock is adjusted for optimum detection of the symbols by synchronizing the sampling to the symbol rate of the incoming signal.

In certain cases, such as digital processing of unsynchronized frequency-multiplexed signals, the sampling cannot be synchronized to the incoming signal.

Systems have been proposed, when it is not possible to alter the sampling clock, for interpolating among the non-synchronized samples so as to produce the correct strobe values at the output of a digital processor which are the same as the strobe values which would occur if the original sampling had been synchronized to the symbol (see F. M. Gardner, "Interpolation in Digital Modems—Part I: Fundamentals", *IEEE Transactions on Communications*, Vol. 41, No. 3, pp 501–507, March 1993 and "Interpolation in Digital Modems—Part II" *IEEE Transactions on Communications*, Vol 41, No. 6, pp 998–1008, June 1993).

While the interpolation system proposed by Gardner is able to be adjusted within a limited range, the co-existence of a wide variety of data transmission standards for high speed data services, such as digital television signal transmission, imposes variability requirements beyond those contemplated in Gardner's proposals.

In a somewhat analogous situation, involving adaptable modems, an approach was taken by two of the present inventors, Bao and Poon, along with co-workers Oshiki Mizutani and Hiroyki Nakayama of Japan, to provide a reconfigurable "Universal Modem for Digital Video, Audio and Data Communications" (see U.S. Pat. No. 5,940,438 issued Aug. 17, 1999). In that universal modem arrangement, the modem is arranged to be software reconfigurable to accommodate different data rates and different modulation schemes.

In a related manner, the present invention is directed to providing a program (software) controlled, reconfigurable symbol timing recovery system with non-synchronized sampling. The system is particularly suitable for processing high definition digital television signals with various standards such as Vestigial Side Band Modulation (VSB—over the air signals), Quadrature Amplitude Modulation (QAM—cable signals) and Quadrature Phase Shift Keying (QPSK—satellite signals).

BRIEF DESCRIPTION OF THE DRAWING

These and other features of the present invention will be better understood, taken in conjunction with the Detailed Description in conjunction with the Drawing, in which.

DESCRIPTION OF PREFERRED EMBODIMENT

A fundamental equation for digital interpolation of data signals (as disclosed by Gardner) is:

$$y(kT_i) = y[(n_k + \mu_k)T_s]$$

$$= \sum_{i=I_1}^{I_2} x[n_k - i]T_s]h_I[(i + \mu_k)T_s]$$

where $\{x(n)\}$ is a sequence of signal samples taken at intervals $T_s$, and $h_I(t)$ is the finite—duration impulse response of a fictitious, time-continuous, analog interpolating filter. Digital operations following the above equation deliver interpolants $y(k)$ at adjustable intervals $T_i$. $T_i$ is in general incommensurate with $T_s$. In the equation, the filter index $i=I_1$ to $I_2$, the basepoint index $n_k$ (which identifies the $I=I_2-I_1+1$ signal samples to be used for the kth interpolant) and the fractional interval $\mu_k$ (which identifies the I filter coefficients to be employed for the kth interpolant) are parameters of importance.

Figure 1:
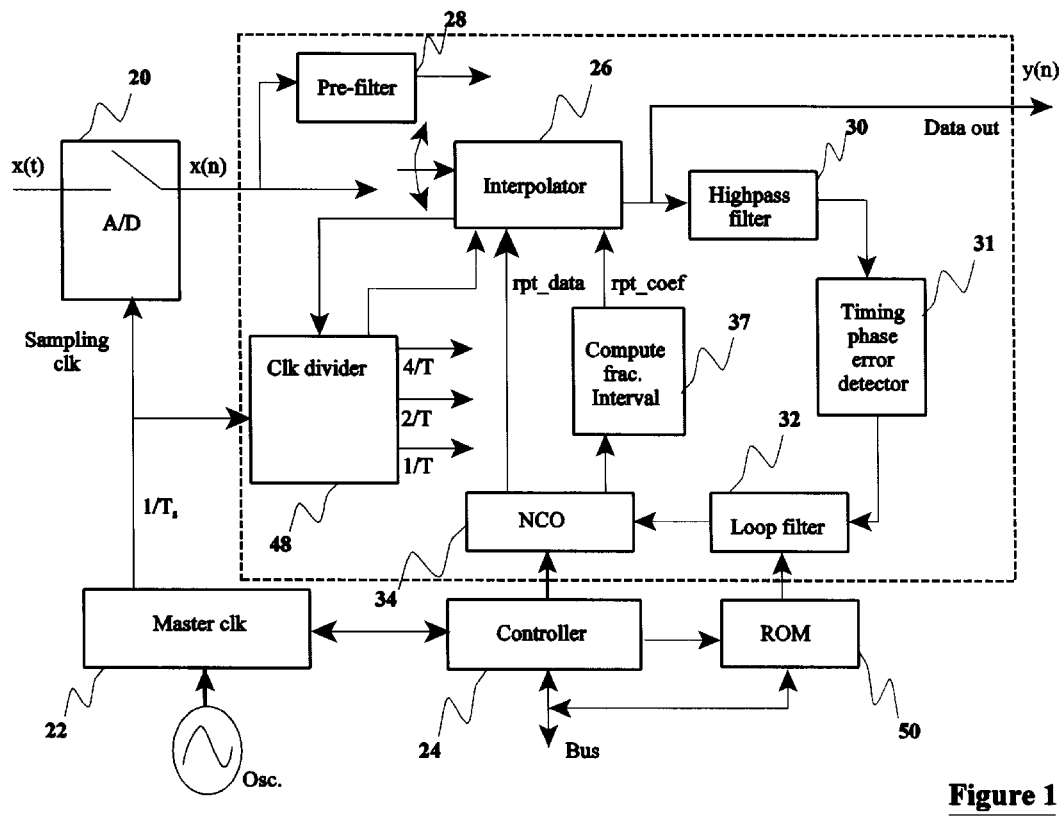
FIG. 1 is a block diagram of a variable-rate symbol timing recovery system with non-synchronized sampling, in which the system is reconfigurable for different signal modulation schemes.

In the operation of the system according to the present invention, as illustrated in FIG. 1, samples of an incoming signal $x(t)$ are taken at an A/D converter 20 at uniform intervals $T_s$ by applying a predetermined sampling clock ("sampling clk") from a master clock circuit 22 at a frequency $1/T_s$. The operating frequency of master clock 22 is set, depending on the nature of the incoming signal, by a controller 24. The samples can be identified as $x(nT_s)=x(n)$.

The signal samples $x(n)$ are supplied to an interpolator 26, either directly or via a pre-filter 28, depending on the modulation scheme and data rate of the incoming signal. Pre-filter 28 is a selectable low pass filter which is switched according to control information provided by controller 24. As noted above, controller 24 responds to information contained in the incoming signal or to control information provided locally to configure the system according to the nature of the received signals.

Figure 2:
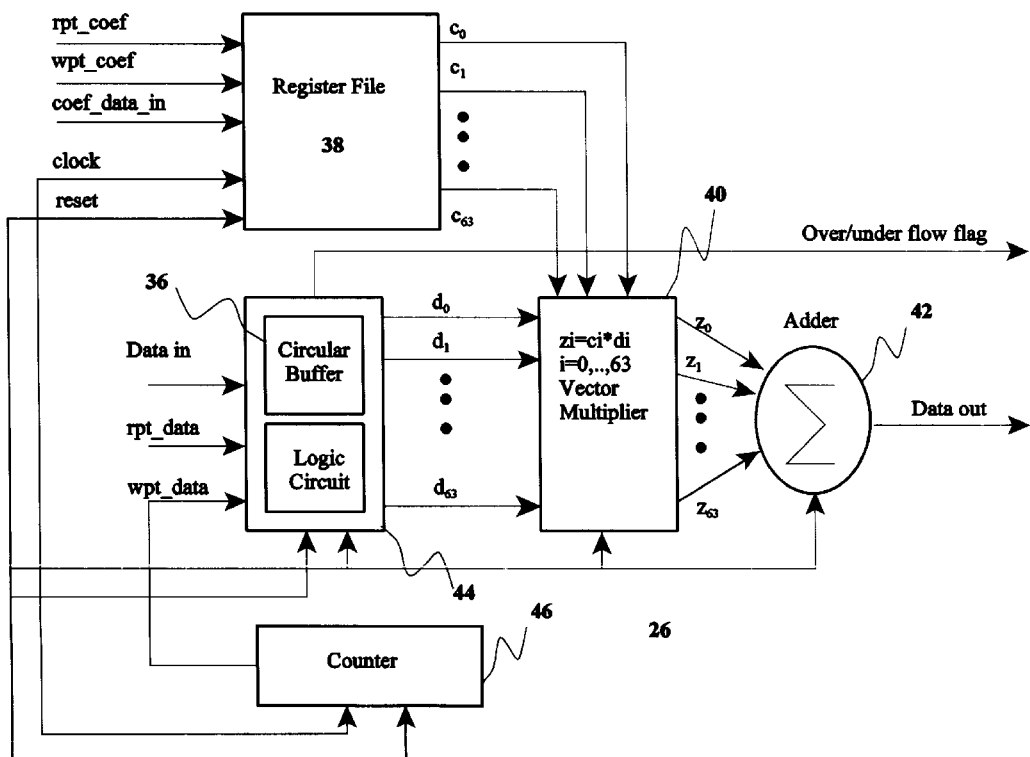
FIG. 2 is a block diagram of details of the interpolator portion of the system of FIG. 1.

Interpolator 26, additional details of which are shown in FIG. 2, provides interpolants which may be identified as $y(kT_i)=y(n)$ at intervals $T_i$.

The interval $T_i$ is, in fact, adjusted by the timing loop so that strobes in the loop are brought into synchronism with the data symbols of the signal. That is, the effective interpolation interval $T_i$ is not a constant but is set by operation of the timing recovery loop. The data output $y(n)$ is provided by interpolator 26 as indicated.

The output of interpolator 26 also is applied to a high pass filter 30 in the feedback control path of the timing loop. High pass filter 30 extracts the timing information of the signal.

The output of high pass filter 30 is coupled to a timing phase error detector 31, which in turn, is coupled via a loop filter 32 to the control input of a number controlled oscillator (NCO) 34. Timing phase error detector 31 and loop filter 32 operate in a manner conventionally employed in second order phase locked loop systems.

NCO 34 is operated so that its average period is $T_i$. Recycling of the NCO register indicates that a new interpolant is to be computed, using the signal samples currently residing in the circular buffer register portion 36 of interpolator 26 (see FIG. 2).

The block 37 labelled "compute frac. interval" operates, for example, in the manner described by Gardner to adjust interpolator 26 to sample the signals appropriately.

As is shown in FIG. 2, interpolator 26 includes the circular buffer register 36 noted above for storing and supplying data samples, a register file 38 for storing interpolator filter coefficients (indicated as $c_0$ through $c_{63}$ for the illustrated 64 tap interpolator filter), a vector multiplier 40 for appropriately combining data signals ($d_0$–$d_{63}$) with filter coefficients ($c_0$–$c_{63}$) to produce data signals ($z_0$–$z_{63}$), an adder 42 for combining the multiplied signals ($z_0$–$z_{63}$) and providing them to the "data out" (y(n)) line and a logic module 44 under control of a counter 46 to provide the necessary control functions.

The system also includes a clock divider 48 for generating clocks at rates 1/T, 2/T, 4/T from the output of master clock 22, with 1/T as the nominal symbol rate. The output of clock divider 48 is selected by means of controller 24 to accommodate the particular type of received signals.

A read-only memory (ROM) 50 is associated with controller 24 and stores appropriate data such as filter coefficients, loop constant parameters and loop gain parameters as necessary.

Controller 24 also effects initial setting of the various parts of the system, and testing, rebooting and interfacing with any external control devices (not shown).

In high speed digital data services, depending on the applications, data transmission rates can be quite different. Digital broadcasting satellite services (ITU DVB-S), for example, employ a data rate varying from 20.3 MHz to 42.2 MHz, whereas only 6 MHz is used in US terrestrial/cable broadcast services (ATSC Digital Television Standard Doc. A/53, 1995).

For a specific application, conventional timing recovery circuits can be designed to provide the synchronized samples of incoming signal for digital demodulation in the receiver. In general they can not be reused for other applications. Unlike conventional timing recovery circuits, the variable-rate timing recovery system according to this invention can be readily reconfigured to meet different data rate requirements with maximum hardware utilization (i.e., with minimum unused hardware resources). In addition, it can be reconfigured to fit different modulation schemes, e.g., 64/256 QAM, QPSK, 8-PSK.

While the invention has been described in terms of a preferred embodiment of the invention, it should be apparent to those skilled in the art that the foregoing is merely illustrative and not limiting, having been presented by way of example only. Modifications and other embodiments are within the scope of one of ordinary skill in the art and are contemplated as falling within the scope of the invention as limited only by the appended claims and equivalents thereof.

What is claimed is:

1. An adaptable, variable rate symbol timing recovery system for a digital signal receiver comprising:

an analog to digital signal converter having analog signal input and digital data signal output terminals;

a source of selectable, substantially fixed rate, data sampling clock signals coupled to said signal converter for sampling a signal received at said input at a predetermined, substantially fixed clock rate depending on data rate and modulation characteristics of said signal received;

digital signal processing loop means coupled to said digital data signal output terminal for adjustably producing interpolant signals in synchronism with data signals at said output terminal which are asynchronous with respect to said substantially fixed rate clock signals; and controller means for selectively configuring said data sampling clock signal source and said digital signal processing loop according to the data rate and modulation characteristics of said signal received.

2. An adaptable, variable rate symbol timing recovery system according to claim 1 wherein:

said digital signal processing loop means further comprises interpolating means for interpolating among data signals which are asynchronous with respect to said data sampling clock signals for producing said interpolant signals, said interpolant signals having timing intervals between adjacent ones thereof which are adjusted by said loop to provide strobes substantially in synchronism with data symbols of said digital data signal.

3. An adaptable, variable rate symbol timing recovery system according to claim 2 wherein:

said digital signal processing loop means is coupled to said digital data signal output terminal of said converter by a selectively configurable coupling means, the configuration of which is selected by said controller according to the data rate and modulation characteristics of said signal received.

4. An adaptable, variable rate symbol timing recovery system according to claim 3 wherein:

said selectively configurable coupling means comprises at least a low pass filter.

5. An adaptable, variable rate symbol timing recovery system according to claim 4 wherein:

said selectively configurable coupling means further comprises an alternate direct signal path.

6. An adaptable, variable rate symbol timing recovery system according to claim 3 wherein:

said digital signal processing loop means further comprises a high pass filter coupled in a feedback control path of said processing loop for extracting timing information from said digital data signal;

a timing phase error detector for supplying a feedback correction signal based on said timing information; and a controlled oscillator for providing an adjustable reference signal to said interpolating means in response to said feedback correction signal.

7. An adaptable, variable rate symbol timing recovery system according to claim 6 wherein:

said interpolating means further comprises a circular buffer register for storing and circulating data signal samples in response to said controller.

8. An adaptable, variable rate symbol timing recovery system according to claim 6 wherein:

said controlled oscillator comprises a number controlled oscillator for providing a plurality of selectable, internal clock signals for said loop at a plurality of multiples of said data sampling clock signals and at controllable phasing independent of said source of fixed rate sampling clock signals.

9. An adaptable, variable rate symbol timing recovery system according to claim 8 wherein:

said number controlled oscillator provides internal clock signals at a multiple selected by said controller.

10. An adaptable, variable rate symbol timing recovery system according to claim 8 wherein:

said digital signal processing loop means further comprises a register file means for storing filter coefficients for said interpolating means.

11. An adaptable, variable rate symbol timing recovery system according to claim 10 wherein:

said digital signal processing loop means further comprises vector multiplier means for combining data signal samples with each of said filter coefficients.

12. An adaptable, variable rate symbol timing recovery system according to claim 11 wherein:

said digital signal processing loop further comprises adder means for combining a plurality of combination of data signal samples and filter coefficients.

13. An adaptable, variable rate symbol timing recovery system for a digital signal receiver comprising:

an analog to digital signal converter having analog signal input and digital data signal output terminals;

a source of selectable data sampling clock signals coupled to said digital signal converter for sampling a signal received at said input terminal at a rate depending on a data rate and modulation characteristics of said signal received;

digital signal processing loop means coupled to said digital data signal output terminal for adjustably producing interpolant signals in synchronism with data signals at said output terminal which are synchronous with respect to said selected rate clock signal, said digital signal processing loop means including interpolating means for interpolating among data signals which are asynchronous with respect to said data sampling clock signals for producing said interpolant signals, said interpolant signals having timing intervals between adjacent ones thereof which are adjusted by said loop to provide strobes substantially in synchronism with data symbols of said digital data signal; and controller means for selectively configuring said data sampling clock signal source and said digital signal processing loop according to the data rate and modulation characteristics of said signal received.

14. A variable rate timing symbol recovery system for a signal receiver comprising:

an analog to digital converter configured to receive analog signals;

a clock configured to produce clock signals for the analog to digital converter to sample the analog signals to produce digital signals, a rate of the clock signals depending on a data rate and modulation characteristics of the received analog signals;

an interpolator configured to produce symbols from the sampled analog signals; and a controller for setting the rate of the clock signals and the rate of producing the symbols depending on the data rate and modulation characteristics of the received signals.

15. A method for recovering symbols having variable timing in a signal receiver, comprising the steps of:

receiving analog signals in an analog to digital converter;

selecting a rate of a clock signal depending on a data rate and modulation characteristics of the received analog signals;

sampling the received analog signals at the rate of the clock signal in the analog to digital converter to produce digital signals;

interpolating the digital signals to produce the symbols at the rate depending on the data rate and modulation characteristics of the received signals.

* * * * *